C. A. BRIDGWOOD.
WIND SHIELD CLEANER.
APPLICATION FILED APR. 12, 1917.
1,253,929.
Patented Jan. 15, 1918.
2 SHEETS—SHEET 1.
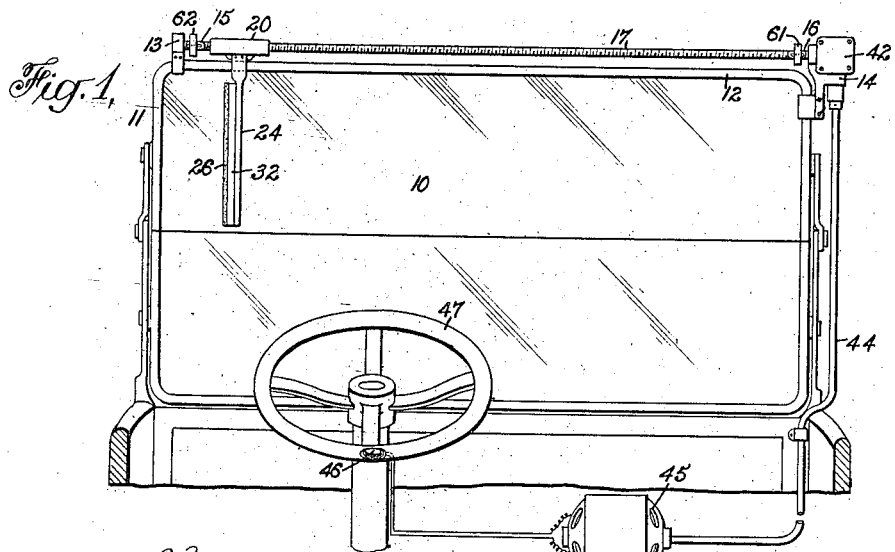
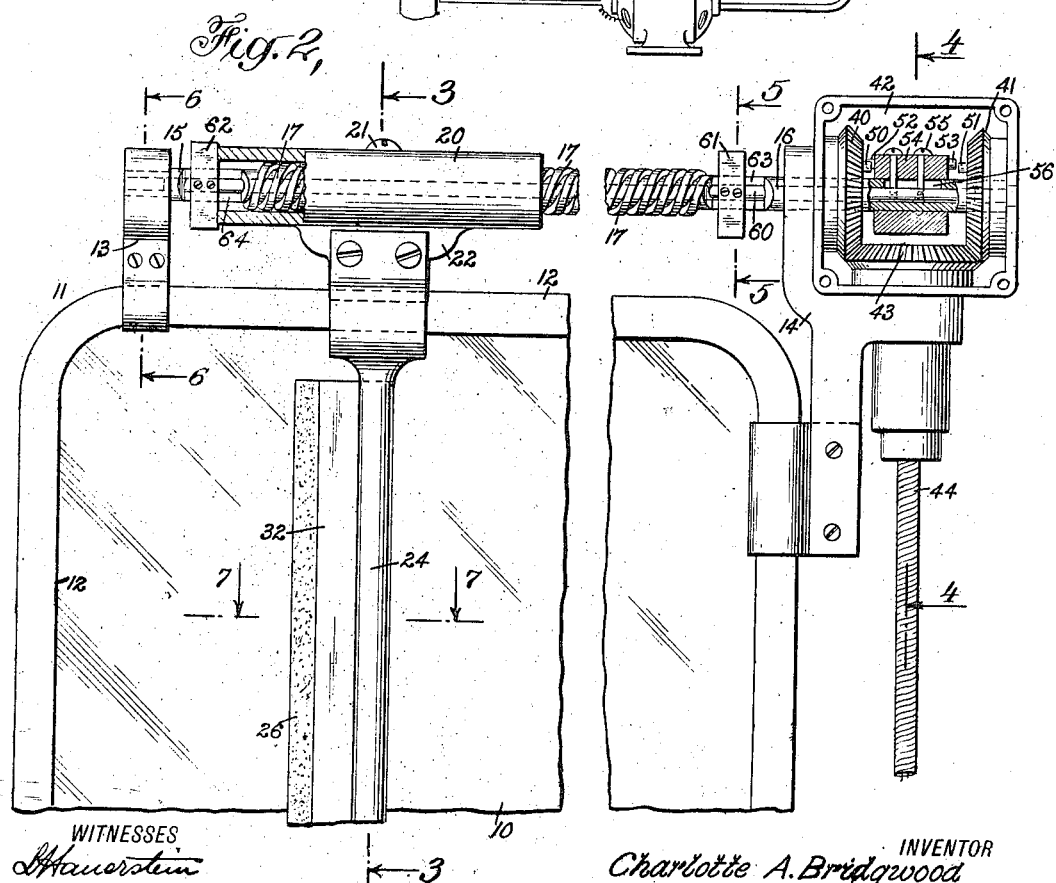
WITNESSES
INVENTOR
Charlotte A. Bridgwood
BY
ATTORNEYS

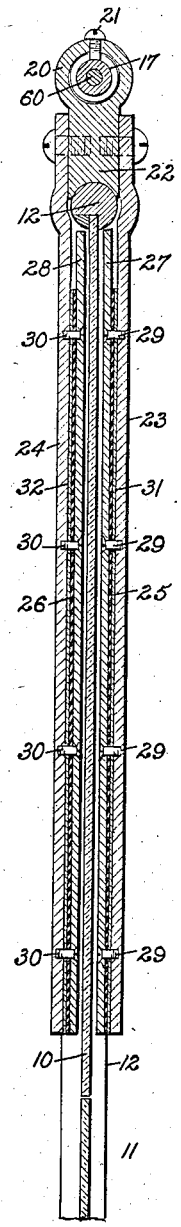
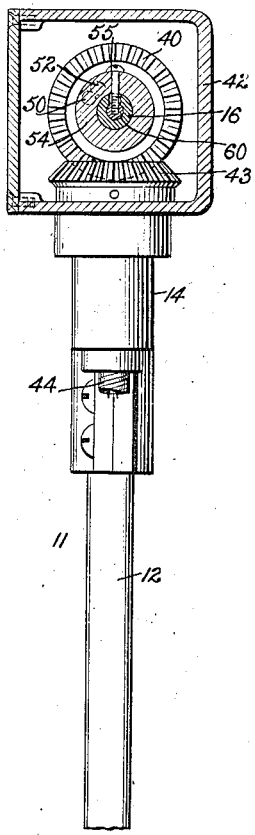
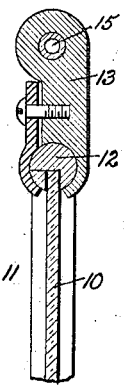
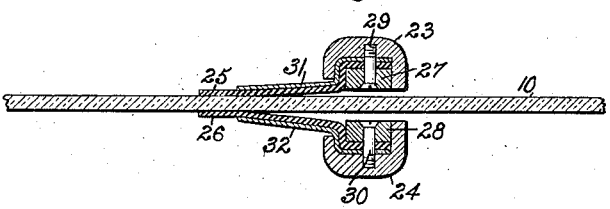

UNITED STATES PATENT OFFICE.

CHARLOTTE A. BRIDGWOOD, OF WESTWOOD, NEW JERSEY.

WIND-SHIELD CLEANER.

1,253,929.

Specification of Letters Patent.  Patented Jan. 15, 1918.

Application filed April 12, 1917. Serial No. 161,479.

*To all whom it may concern:*

Be it known that I, CHARLOTTE A. BRIDGWOOD, a subject of the King of Great Britain, and a resident of Westwood, in the county of Bergen and State of New Jersey, have invented a new and Improved Wind-Shield Cleaner, of which the following is a full, clear, and exact description.

The invention relates to cleaning devices employed for cleaning the wind shields of power driven vehicles such as automobiles, trolley cars, locomotives and the like.

The object of the invention is to provide a new and improved wind shield cleaner arranged to enable the driver or operator in charge of the vehicle to start the mechanism at any time with a view to clean both the inner and outer faces of the wind shield of any accumulated moisture, sleet, snow, rain, dust, or other extraneous matter, without stopping the vehicle or interfering with the proper running thereof. Another object is to provide a cleaner which can be readily applied to power-driven vehicles as now generally constructed.

In order to produce the desired result, use is made of a revoluble screw, a sleeve slidable on the said screw and having a pin engaging the thread of the screw, wiping means attached to the said sleeve and engaging the wind shield to be cleaned, a power driven shaft, and an automatic power driven and reversing gear controlled by the said sleeve and connecting the said shaft with the said screw to rotate the latter alternately in opposite directions.

A practical embodiment of the invention is represented in the accompanying drawings forming a part of this specification, in which similar characters of reference indicate corresponding parts in all the views.

Figure 1 is an elevation of the cleaning device as applied to the wind shield of an automobile, the sides of which are shown in section:

Fig. 2 is an enlarged elevation of the same with parts shown in section;

Fig. 3 is a transverse section of the same on the line 3—3 of Fig. 2:

Fig. 4 is a similar view of the same on the line 4—4 of Fig. 2:

Fig. 5 is a similar view of the same on the line 5—5 of Fig. 2;

Fig. 6 is a similar view of the same on the line 6—6 of Fig. 2; and

Fig. 7 is an enlarged sectional plan view of the wipers in position on the glass plate of the wind shield, the section being on the line 7—7 of Fig. 2.

The glass plate 10 of the upper wind shield 11, shown in Fig. 1, is provided with the usual frame 12 on which are secured two brackets 13 and 14 provided with bearings for the non-threaded ends 15 and 16 of a screw 17 to turn in, the said screw extending a short distance above the top of the wind shield 11 from nearly one side thereof to the other, as plainly indicated in Fig. 1. On the screw rod 17 is mounted to slide a sleeve 20 provided at its middle with a screw or pin 21 engaging with its inner end (see Fig. 3) the thread of the screw 17 so that when the latter is rotated in one direction a traveling motion is given to the sleeve 20 from the left to the right, and when the screw 17 is turned in the opposite direction then a return traveling motion is given to the sleeve 20 to move the latter from the right to the left. The sleeve 20 is provided with a depending member 22 fitting the top of the frame 12 of the wind shield 11 to hold the sleeve 20 against turning on the screw 17. To opposite faces of the depending member 22 of the sleeve 20 are fastened depending arms 23 and 24 to which are fastened wipers 25 and 26, preferably made of pieces of rubber, bearing with their free ends against the opposite faces of the glass plate 10, as plainly illustrated in Fig. 7. The arms 23 and 24 are formed with recesses for the reception of the attaching ends of the wipers 25 and 26, and in order to securely hold the wipers in place on the arms 23 and 24 use is made of drawings 27, 28 fastened by screws 29 and 30 to the arms 23 and 24. Stiffening plates 31 and 32 of sheet metal or similar material engage the outer faces of the wipers 25 and 26 close up to the free ends of the said wipers to stiffen the latter. The stiffening plates 31 and 32 fit into the grooves of the arms 23, 24 and are fastened in place with the wipers by the action of the fastening bars 27 and 28. Any one of the wiping arms 23 and 24 can be readily removed from the depending member 22 of the sleeve 20 for repairs or other purposes whenever it is deemed necessary. It is understood that the wipers 25 and 26 extend nearly throughout the entire height of the glass plate 10 and when the sleeve 20 is moved from the left to the right and back again then the wipers 25 and 26 simultaneously clean both faces of the glass plate 10.

In order to impart a rotary motion to the screw 17, the following arrangement is made: On the right-hand side of the non-threaded portion 16 of the screw 17 are mounted to rotate loosely bevel gear wheels 40 and 41 arranged within a housing 42 formed on the bracket 14. The bevel gear wheels 40 and 41 are in mesh with diametrically opposite sides of a bevel gear wheel 43 secured on a flexible shaft 44 connected with the shaft of a motor 45, preferably of the electric type, and mounted on the automobile at any desired place thereof. The electric motor 45 is controlled by a push button 46, preferably mounted on the steering wheel 47 of the automobile so as to be within convenient control of the driver of the automobile.

The bevel gear wheels 40 and 41 are provided on their opposite faces with clutch members 50 and 51 adapted to be engaged by clutch members 52 and 53 of a double clutch 54 mounted on the non-threaded portion 16 of the screw 17 intermediate the bevel gear wheels 40 and 41. The double clutch member 54 is provided with screws or pins 55 passing through a slot 56 formed lengthwise in the non-threaded portion 16 of the screw 17. By the arrangement described the double clutch member 54 is mounted to slide lengthwise on the non-threaded portion 16 and when rotated it turns the screw 17 owing to the pin 55 extending through the slot 56.

In order to shift the double clutch member 54 from the right to the left or vice versa to engage the clutch members 52 with the clutch members 50 or the clutch members 53 with the clutch members 51, the following arrangement is made: The screw 17 is made hollow and in it is mounted to slide a shifting rod 60 to which the inner ends of the pins 55 are secured, as plainly shown in Figs. 2 and 4. The shifting rod 60 is provided with arms 61 and 62 extending through slots 63 and 64 formed lengthwise on the non-threaded portions 16 and 15 of the screw 17. The arms 61 and 62 are located adjacent the ends of the thread of the screw 17 and are adapted to be engaged by the corresponding ends of the sleeve 20. Thus when the sleeve 20 moves from the right to the left its left end engages the arm 62 and pushes the same and consequently shifts the rod 60 from the right to the left to shift the double clutch member 54 in the same direction thereby engaging the clutch members 52 with the clutch members 50. When the sleeve 20 moves from the left to the right then its right-hand end engages the arm 61 and pushes the latter, the shifting rod 60 and the double clutch member 54 to the right to disengage the clutch members 52 from the clutch members 50 and to engage the clutch members 53 with the clutch members 51. It is understood that when the sleeve 20 engages the arm 62 of the shifting rod 60 the wipers 25 and 26 are in left-hand position on the glass plate 10, and when the sleeve 20 engages the arms 61 then said wipers are in right-hand end position on the glass plate 10.

The operation is as follows:

Presuming that the several parts are in the position shown in Figs. 1 and 2 and the driver presses the push button 46 then the motor 45 is caused to rotate and the shaft 44 is rotated, and the rotary motion of the shaft is transmitted by the bevel gear wheel 43 to the bevel gear wheels 40 and 41, which, owing to their location on opposite sides of the bevel gear wheel 43, are rotated in opposite directions. The rotary motion of the bevel gear wheel 40 is transmitted by its clutch members 50 and the clutch members 52 to the double clutch 54 whereby the screw 17 is rotated in one direction to cause the sleeve 20 to travel from the left to the right thus drawing the wipers 25 and 26 over the faces of the glass plate 10 to clean the same. When the sleeve 20 moves into right-hand position it engages the arms 61 and then pushes the shifting rod 60 to the right whereby the double clutch 54 is moved in a like direction, and its clutch members 52 are moved out of engagement with the clutch members 50, and its clutch members 53 are moved into engagement with the clutch members 51 whereby the double clutch 54 is now rotated in an opposite direction from the bevel gear wheel 41. The screw 17 now rotates in the opposite direction and the sleeve 20 now travels from the right to the left thus moving the wipers 25 and 26 in a like direction over both faces of the glass plate 10. The above operation is repeated as long as the button 46 is held pressed and the motor 45 is rotated. It is understood that the motor 45 can be stopped at any time at the will of the driver and whether the wiping device is in a left-hand position or in a right-hand position on the glass plate 10. It will be seen that by the arrangement described an automatic power transmitting and reversing mechanism is provided which is controlled by the sleeve 20 and causes rotation of the screw 17 alternately in opposite directions.

I do not limit myself to the particular means described for rotating the shaft 44 as the latter may be driven from the motor of the automobile and the push button switch for the electric motor 45 may be located on the dashboard or other part of the automobile and within convenient reach of the driver.

Having thus described my invention, I claim as new and desire to secure by Letters Patent:—

1. In a wind shield cleaner, a revoluble screw, a sleeve slidable on the screw and having a pin engaging the screw thread, wiping means attached to the said sleeve and engaging the wind shield to be cleaned, a power driven shaft, and an automatic power transmitting and reversing gear controlled by the said sleeve and connecting the said shaft with the said screw to rotate the latter alternately in opposite directions.

2. In a wind shield cleaner, a revoluble screw arranged above the top of the wind shield, a sleeve slidable on the said screw and having a pin engaging the thread of the screw, the said sleeve having a sliding connection with the top of the wind shield, wiping means depending from the said sleeve and engaging the wind shield, beveled gear wheels mounted to rotate loosely on the said screw, a driven shaft carrying a beveled gear wheel in mesh at opposite sides with the said gear wheels on the screw, and a clutch mechanism controlled by the said sleeve and adapted to connect the said gear wheels alternately with the said screw to rotate the latter alternately in opposite directions.

3. In a wind shield cleaner, a revoluble screw arranged above the top of the wind shield, a sleeve slidable on the said screw and having a pin engaging the thread of the screw, the said sleeve having a sliding connection with the top of the wind shield, wiping means depending from the said sleeve and engaging the wind shield, beveled gear wheels mounted to rotate loosely on the said screw, a driven shaft carrying a beveled gear wheel in mesh at opposite sides with the said gear wheels on the screw, clutch members on the opposite faces of the said gear wheels on the screw, a double clutch member mounted to slide on and to turn the said screw, the said double clutch member extending between the said gear wheels on the screw and being adapted to alternately engage the clutch members on the said gear wheels on the screw, a shifting rod on which the said double clutch member is secured, and shifting arms on the said rod and adapted to be alternately engaged by the ends of the said sleeve to move the shifting rod alternately in opposite directions.

4. In a wind shield cleaner, a revoluble screw arranged above the top of the wind shield, a sleeve slidable on the said screw and having a pin engaging the thread of the screw, the said sleeve having a sliding connection with the top of the wind shield, wiping means depending from the said sleeve and engaging the wind shield, beveled gear wheels mounted to rotate loosely on the said screw, a driven shaft carrying a beveled gear wheel in mesh at opposite sides with the said gear wheels on the screw, the latter being hollow and provided with slots, clutch members on the opposite faces of the said gear wheels on the screw, a double clutch member adapted to engage alternately the said clutch members on the gear wheels, a shifting rod slidable in the said screw, a connection between the said shifting rod and the said double clutch member and extending through one of the slots in the said screw, and arms attached to the said shifting rod and extending through other slots in the said screw and into the path of the ends of the said sleeve.

5. In a wind shield cleaner, a revoluble screw, a sleeve slidable on the screw and having means engaging the thread of the screw to move the sleeve lengthwise on the screw on turning the screw, wiping means attached to the said sleeve and engaging the wind shield to be cleaned, lower driven means, and an automatic power transmitting and reversing means controlled by the said sleeve and connecting the said power driven means with the said screw to rotate the latter alternately in opposite directions.

CHARLOTTE A. BRIDGWOOD.